(12) United States Patent
Ooi et al.

(10) Patent No.: US 10,916,359 B2
(45) Date of Patent: Feb. 9, 2021

(54) ELECTRIC WIRE CONDUCTOR, COVERED ELECTRIC WIRE, AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hayato Ooi, Yokkaichi (JP); Toyoki Furukawa, Yokkaichi (JP); Yasuyuki Otsuka, Yokkaichi (JP); Kinji Taguchi, Yokkaichi (JP); Kei Sakamoto, Osaka (JP); Tetsuya Kuwabara, Osaka (JP); Tooru Tanji, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/759,980

(22) PCT Filed: Nov. 6, 2018

(86) PCT No.: PCT/JP2018/041143
§ 371 (c)(1),
(2) Date: Apr. 28, 2020

(87) PCT Pub. No.: WO2019/093310
PCT Pub. Date: May 16, 2019

(65) Prior Publication Data
US 2020/0335240 A1 Oct. 22, 2020

(30) Foreign Application Priority Data

Nov. 8, 2017 (JP) .................................. 2017-215294
May 16, 2018 (JP) .................................. 2018-094963

(51) Int. Cl.
*H01B 5/08* (2006.01)
*H01B 7/04* (2006.01)
(Continued)

(52) U.S. Cl.
CPC ............ *H01B 7/04* (2013.01); *H01B 7/0045* (2013.01); *H01B 7/02* (2013.01); *B60R 16/0207* (2013.01)

(58) Field of Classification Search
CPC ........................................................ H01B 5/08
See application file for complete search history.

(56) References Cited

U.S. PATENT DOCUMENTS 1,692,767 A * 11/1928 Davis ...................... H01B 5/08
29/445
4,329,539 A 5/1982 Tanaka et al.
(Continued)

FOREIGN PATENT DOCUMENTS

JP S52-074877 A 6/1977
JP S59-130011 A 7/1984
(Continued)

OTHER PUBLICATIONS

Jan. 8, 2019 Search Report Issued in International Patent Application No. PCT/JP2018/041143.
(Continued)

*Primary Examiner* — Chau N Nguyen
(74) *Attorney, Agent, or Firm* — Oliff PLC

(57) ABSTRACT

An electric wire conductor having both flexibility and a space-saving property, a covered electric wire, and a wiring
(Continued)

harness containing such an electric wire conductor. The electric wire conductor contains a plurality of elemental wires twisted together, and has a non-circular portion in which a cross section intersecting an axial direction of the wire strand has a non-circular shape. The cross section of the non-circular portion has a continuous vacancy capable of accommodating two or more of the elemental wires. Further, a covered electric wire contains the electric wire conductor and an insulator covering the electric wire conductor. Furthermore, a wiring harness contains the covered electric wire.

6 Claims, 4 Drawing Sheets

(51) Int. Cl.
*H01B 7/00* (2006.01)
*H01B 7/02* (2006.01)
*B60R 16/02* (2006.01)

(56) References Cited

U.S. PATENT DOCUMENTS

| | | | | |
|---|---|---|---|---|
| 4,980,517 | A * | 12/1990 | Cardas | H01B 5/08 |
| | | | | 174/129 R |
| 5,430,256 | A * | 7/1995 | Taylor | H01B 11/12 |
| | | | | 174/110 FC |
| 10,658,092 | B2 * | 5/2020 | Ooi | H01B 7/04 |
| 10,818,411 | B2 * | 10/2020 | Wakamatsu | H01B 5/08 |
| 2005/0006135 | A1 * | 1/2005 | Nakayama | H01B 7/2806 |
| | | | | 174/128.1 |
| 2005/0150680 | A1 * | 7/2005 | Sugihara | H01B 13/01263 |
| | | | | 174/128.1 |
| 2012/0261185 | A1 | 10/2012 | Murao et al. | |
| 2017/0309373 | A1 | 10/2017 | Tanaka et al. | |
| 2018/0114610 | A1 | 4/2018 | Uegaki et al. | |

FOREIGN PATENT DOCUMENTS

| | | |
|---|---|---|
| JP | S63-158710 A | 7/1988 |
| JP | H5-198220 A | 8/1993 |
| JP | H8-249926 A | 9/1996 |
| JP | 2003-331655 A | 11/2003 |
| JP | 2009-245658 A | 10/2009 |
| JP | 2011-134667 A | 7/2011 |
| JP | 2014-130739 A | 7/2014 |
| JP | 2017-188431 A | 10/2017 |
| JP | 2017-224565 A | 12/2017 |
| WO | 2017/056278 A1 | 4/2017 |

OTHER PUBLICATIONS

Jan. 8, 2019 Search Report Issued in International Patent Application No. PCT/JP2018/041142.
Nov. 6, 2019 International Preliminary Report on Patentability Issued in International Patent Application No. PCT/JP2018/041142.
Jun. 21, 2019 International Preliminary Report on Patentability Issued in International Patent Application No. PCT/JP2018/041143.
U.S. Appl. No. 16/759,987, filed Apr. 28, 2020 in the name of Ooi et al.

* cited by examiner

ELECTRIC WIRE CONDUCTOR, COVERED ELECTRIC WIRE, AND WIRING HARNESS

TECHNICAL FIELD

The present invention relates to an electric wire conductor, a covered electric wire, and a wiring harness, and more specifically, to an electric wire conductor made of a wire strand, a covered electric wire containing an insulator on an outer periphery of the electric wire conductor, and a wiring harness including the covered electric wire.

BACKGROUND ART

A flat cable containing a flat-shaped conductor is commonly known. A flat cable occupies a smaller space for routing than a conventional electric wire containing a conductor having a substantially circular cross section.

As described in Patent Literature 1, a flat rectangular conductor is often used as a conductor for the conventional flat cable. The flat rectangular conductor is made of a single metal wire formed to have a rectangular cross section.

CITATION LIST

Patent Literature

Patent Literature 1: JP 2014-130739 A

SUMMARY OF INVENTION

Problems to be Solved by the Invention

The flat rectangular conductor made of a single metal wire has comparatively high flexibility, and easily bends in a height (thickness) direction of the flat cross section. However, in a width direction of the flat cross section, the conductor has low flexibility, and is too rigid to bend easily. Thus, the flat cable having the rectangular conductor made of a single metal wire hardly bends in the particular direction, which lowers workability of the cable when routed.

Meanwhile, an electric wire conductor having a cross section in various outer shapes other than the flat shape can be obtained by compressing, for example, a conductor made of a wire strand containing metal elemental wires twisted together. By selecting the shape of the electric wire conductor in accordance with a space for routing an electric wire or an arrangement pattern of electric wires in the case of assembling a plurality of electric wires, for example, the electric wire can be easily arranged in a limited space. However, when the wire strand is formed by compressing, for example, the elemental wires are disposed densely, which possibly interferes flexible bending of the electric wire conductor. Thus, the flexibility is hardly obtained where the wire strand is formed.

The present invention has been made to solve the above problems, and an object of the present invention is to provide an electric wire conductor having both flexibility and a space-saving property, a covered electric wire, and a wiring harness including such an electric wire conductor.

Means of Solving the Problems

To achieve the objects and in accordance with the purpose of the present invention, an electric wire conductor according to the present invention contains a wire strand containing a plurality of elemental wires twisted together, the conductor having a non-circular portion where a cross section of the wire strand intersecting an axial direction of the wire strand has a non-circular shape, and having a continuous vacancy in the cross section of the non-circular portion which is capable of accommodating two or more of the elemental wires.

Here, the cross section of the non-circular portion preferably has a flat or polygonal shape.

Preferably, the non-circular portion contains no burr on an outer periphery of the cross section.

Preferably, deformation ratios of the elemental wires from a circle in the cross section of the non-circular portion are lower at apart facing an outer periphery of the non-circular portion than at a center part of the non-circular portion.

In the electric wire conductor, the cross section of the non-circular portion preferably has a continuous vacancy capable of accommodating three or more of the elemental wires.

A covered electric wire according to the present invention contains the electric wire conductor as described above and an insulator covering the electric wire conductor.

A wiring harness according to the present invention contains the covered electric wire as described above.

Advantageous Effects of Invention

The electric wire conductor according to the present invention has high flexibility because it is formed of a wire strand but not of a single wire. Further, the non-circular portion having the non-circular cross section facilitates routing in a small space and assembling a plurality of electric wires, thus improves the space-saving property compared with a conventional electric wire conductor having a substantially circular cross section.

Further, in the electric wire conductor according to the present invention, the cross section of the non-circular portion has a continuous vacancy which is capable of accommodating two or more of the elemental wires. The electric wire conductor can bend easily through migration of the elemental wire to the vacancy, thus enhancing the flexibility. In addition, providing such a vacancy can suppress formation of a sharp protrusion (i.e., burr) on a peripheral part which is possibly produced by high compression of the electric wire conductor.

Here, the cross section of the non-circular portion having a flat or polygonal shape has plain surfaces on the periphery of the non-circular portion corresponding to edges of the flat or polygonal shape, which allows easy routing of the electric wire along the plain surface, or easy assembling of a great number of the electric wires closely to one another. Thus, the space-saving property can be remarkably improved.

When the non-circular portion contains no burr on the outer periphery of its cross section, it is possible to prevent the characteristics of the elemental wires from being affected by a large deformation and a large load enough to form burrs applied to the elemental wires at the peripheral part. In a case of forming the conductor by compressing, for example, if the vacancies between the elemental wires are made small, the burr tends to be formed on the periphery of the conductor. Thus, when the electric wire conductor contains no burr, it indicates that the large vacancies are left between the elemental wires and the electric wire conductor maintains high flexibility.

When the deformation ratios of the elemental wires from a circle in the cross section of the non-circular portion are lower at the part facing the outer periphery of the non-circular portion than at the center part of the non-circular portion, intensive deformations of the elemental wires located in the peripheral part and application of a large load to the wires can be prevented. Further, formation of the burr on the outer periphery of the electric wire conductor due to the deformation of the elemental wires can be suppressed.

When the electric wire conductor has a non-circular portion with a cross section having a continuous vacancy capable of accommodating three or more of the elemental wires, migration of the elemental wires to the vacancy is remarkably facilitated when the electric wire conductor is bent, thus provides remarkably high flexibility.

Since the covered electric wire according to the present invention contains the electric wire conductor as described above, it has flexibility brought about by the electric wire conductor made of the wire strand and having the vacancy of sufficient size between the elemental wires, as well as a space-saving property brought about by the electric wire conductor having the non-circular portion having the non-circular cross section. Therefore, in the case where the plurality of covered electric wires are aligned or stacked when routed, the routing can be carried out with high degree of freedom while saving the space.

As the wiring harness according to the present invention contains the covered electric wire containing the electric wire conductor having the non-circular cross section as described above, it has excellent flexibility and a space-saving property, and thus can be suitably used as a wiring material in a limited space such as an automobile.

BRIEF DESCRIPTION OF DRAWINGS

FIG. 1A shows elemental wires in the cross section, and FIG. 1B additionally shows straight lines contouring an outer shape of the cross section, and elemental wires which can be accommodated in a vacancy.

FIG. 2A shows elemental wires in the cross section, and FIG. 2B additionally shows straight lines contouring an outer shape of the cross section, and elemental wires which can be accommodated in a vacancy.

FIG. 3C is a magnified photographic image of FIG. 3A which shows elemental wires virtually accommodated in a vacancy.

FIGS. 4C and 4D are magnified photographic images of FIGS. 4A and 4B, respectively, that show elemental wires virtually accommodated in vacancies.

DESCRIPTION OF EMBODIMENTS

Hereinafter, detailed descriptions of an electric wire conductor, a covered electric wire, and a wiring harness according to one embodiment of the present invention will be provided with reference to FIGS. 1 to 4. A covered electric wire according to one embodiment of the present invention contains an electric wire conductor according to one embodiment of the present invention and an insulator covering the conductor. In addition, a wiring harness according to one embodiment of the present invention contains a plurality of covered electric wires assembled together containing the covered electric wire according to one embodiment of the present invention.

[Electric Wire Conductor]

(1) Cross-Sectional Shape of the Electric Wire Conductor

FIGS. 1A, 1B, 2A and 2B show cross sections perpendicularly intersecting an axial direction (longitudinal direction) of an electric wire conductor 10 according to one embodiment of the present invention. The electric wire conductor 10 is formed of a wire strand containing a plurality of elemental wires 1 twisted together. Further, at least a part of the electric wire conductor 10 along the axial direction has a portion having a non-circular cross section. In other words, the electric wire conductor 10 has a non-circular portion where the cross section perpendicularly intersecting the axial direction of the electric wire conductor 10 has an outer shape other than a circle or substantially circle. In the present embodiment, the entire electric wire conductor 10 along the axial direction is formed as the non-circular portion.

Figure 1A:
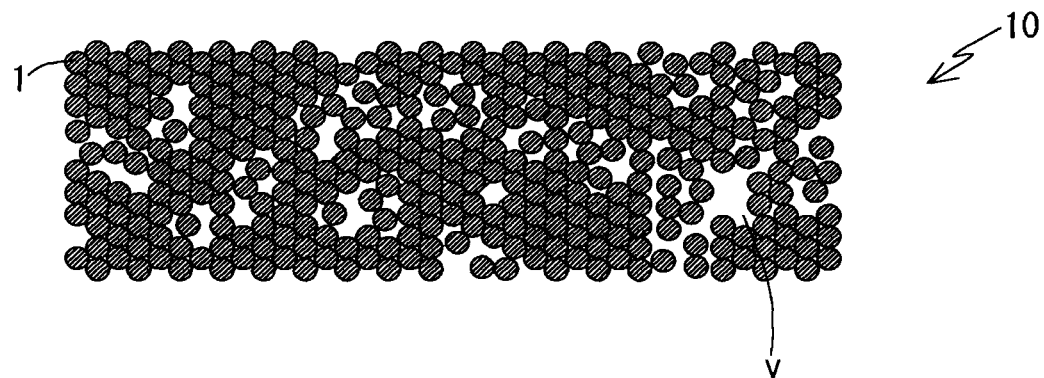
FIGS. 1A and 1B are cross sectional views of an electric wire conductor having a flat cross section according to one embodiment of the present invention.
Figure 1B:
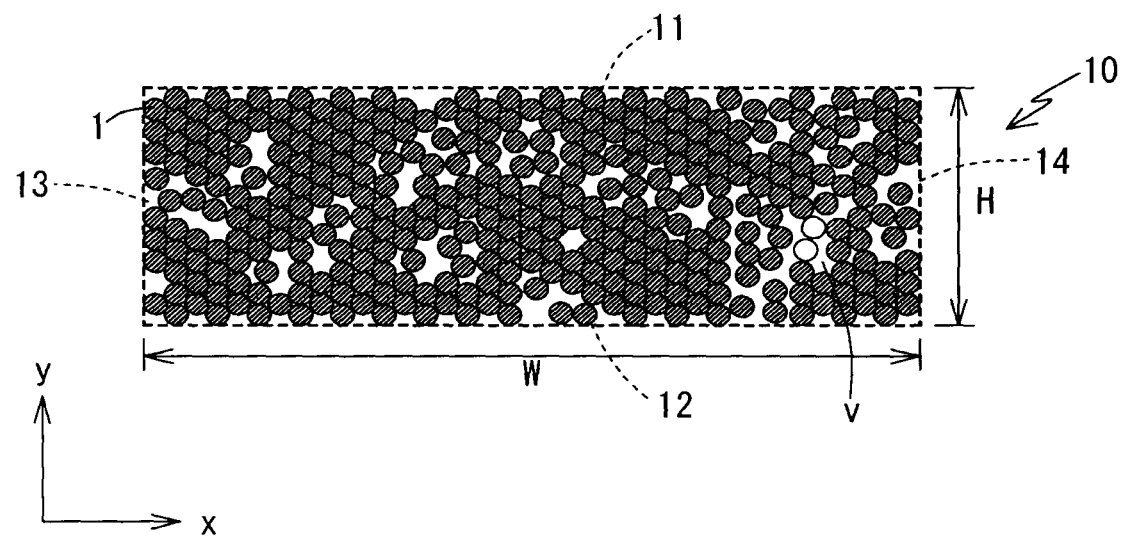

The cross section of the non-circular portion may have any specific shape as long as it is not a circle or substantially circle. First, the non-circular portion having a flat cross section as shown in FIGS. 1A and 1B will be described for example. Here, the concept that "the cross section of the electric wire conductor 10 is flat" describes a state where a width W, which is a length of the longest line among lines that pass through the cross section in parallel to edges constituting the cross section and encompass the entire cross section, is larger than a height H, which is a length of a line perpendicular to the above-mentioned longest line and encompass the entire cross section.

While the cross section of the electric wire conductor 10 may have any specific shape as long as it is flat, the cross section of the electric wire conductor 10 in FIGS. 1A and 1B of the present embodiment has opposing edges 11 and 12 that are parallel to each other along a direction of width W (width direction x) of the flat shape. In other words, two parallel lines 11 and 12 can be drawn in the width direction x, so as to circumscribe the outer elemental wires 1 forming the cross section of the electric wire conductor 10. In the present description, concerning the shape of the electric wire conductor 10, concepts for describing relationships among lines and surfaces such as parallel and vertical may include a deviation with reference to the concepts in geometry such as a deviation at an angle of approximately plus or minus 15 degrees, or an R shape where each corner is rounded. In addition, concepts of edges, straight lines, plain surfaces, or the like may include a curved line or a curved surface with a deviation at an angle of approximately plus or minus 15 degrees from a geometric straight line or a plain surface. In the present embodiment, the electric wire conductor 10 has a rectangular cross section.

As the electric wire conductor 10 according to the present embodiment has a flat cross section, when it is routed in a form of the covered electric wire, for example, a space necessary for routing may be made smaller than a case of routing an electric wire having a substantially circular cross section of the same conductor cross-sectional area as the electric wire conductor 10. In other words, spaces around an electric wire in which other electric wires or other members are not allowed to be disposed can be reduced. In particular, a space occupied by the electric wire in a height direction y can be made smaller. Thus, the electric wire effectively achieves a space-saving property.

This allows other electric wires or other members to be sufficiently disposed in a space vertically provided in the height direction (±y direction) outside of the electric wire. For example, in the case of routing the electric wire along a surface for routing, when a flat surface of the electric wire, that is, a surface parallel to the width direction x is arranged along the surface for routing, it is possible to effectively provide a space above the electric wire (in a direction opposing to the surface for routing, having the electric wire therebetween). Further, in a case where a conductor cross-sectional area of the electric wire conductor 10 is desired to be large, the space-saving property in the height direction y can be maintained by making the width W large while keeping the height H small.

In particular, the electric wire conductor 10 having opposing edges 11 and 12 parallel to the width direction x in its cross section can provide a large space vertically in the height direction (±y direction) outside the routed electric wire, whereby the excellent space-saving property is achieved. Especially, in the case of assembling a plurality of electric wires by stacking one electric wire on another electric wire, spaces between the plurality of electric wires along the height direction y can be reduced. Here, the concept of "assembling a plurality of electric wires" includes both of a configuration where a plurality of electric wires are integrally bundled with an insulation material, for example, and a configuration where a plurality of independent electric wires are closely disposed.

Furthermore, the electric wire conductor 10 having a rectangular cross section can provide a large space vertically (±y direction) and laterally (±x direction), whereby the space-saving property is further improved. Especially, in the case of assembling the plurality of electric wires by stacking one electric wire on another electric wire, or by aligning one electric wire laterally to another electric wire, spaces between the plurality of electric wires along the height direction y and the width direction x can be reduced.

As described above, the electric wire conductor 10 according to the present embodiment contains the wire strand containing a plurality of elemental wires 1 twisted together, and the wire strand has a flat outer shape. Therefore, the electric wire conductor 10 has excellent flexibility in each direction. Patent Literature 1 discloses a rectangular conductor that has flexibility in the height direction to a certain degree, but shows low flexibility in the width direction and is too rigid to bend easily in the width direction. In contrast, the electric wire conductor 10 according to the present embodiment containing the wire strand has the excellent flexibility and easily bends in the width direction x as well as the height direction y.

Thus, the electric wire conductor 10 according to the present embodiment can achieve both the flexibility which provides freedom in routing, and the space-saving property. In an automobile, for example, due to recent high functionalization, the number of electric wires and components to be disposed is increasing. Also, a larger electric current is demanded for vehicles such as electric vehicles, which results in enlargement of a diameter of the electric wire, whereby a space for routing individual electric wires has been reduced. However, the electric wire conductor 10 according to the present embodiment can effectively use a small space when routed because of the space-saving property and the excellent flexibility. In the case of assembling a great number of electric wires, or using an electric wire having a large conductor cross-sectional area, this advantage is especially enhanced.

In FIGS. 1A and 1B, the electric wire conductor 10 has a rectangular cross section. However, as described above, the cross section of the electric wire conductor 10 may have any shape as long as it is flat. Examples of a cross section having a shape other than the rectangular shape may include an ellipse shape (a shape of a rectangle with half circles attached to both ends) and quadrangle shapes such as a trapezoid shape and a parallelogram shape. When the electric wire conductor 10 has a quadrangle cross section, a great number of electric wire conductors 10 may be disposed in the height direction y and the width direction x with small spaces, which contributes to the excellent space-saving property for assembling a great number of electric wires. This advantage is especially remarkable when the cross section has a rectangle shape as described above.

In addition to the flat shape, the cross section of the electric wire conductor 10 may have any shape other than a circle. The cross-sectional shape of the electric wire conductor 10 is appropriately determined according to, for example, a shape and size of a space for routing the electric wire containing the electric wire conductor 10, or desired positional relationships with the other electric wires or objects that are disposed in the vicinity. This allows the electric wires to be routed in a limited space or disposed closely to outer objects. Thus, the excellent space-saving property can be achieved as well as the excellent flexibility brought about by the electric wire conductor 10 containing a wire strand.

In particular, the electric wire conductor 10 preferably has a cross section having a polygonal shape other than the flat shape. The concept that "the electric wire conductor 10 has a polygonal cross section" describes a state where a plurality of straight lines can be drawn to circumscribe outer elemental wires 1 in the cross section of the electric wire conductor 10, and the plurality of straight lines forms edges of a polygon. Suitable examples of the polygon other than the quadrangle include a pentagon, a hexagon, and an octagon.

Figure 2A:
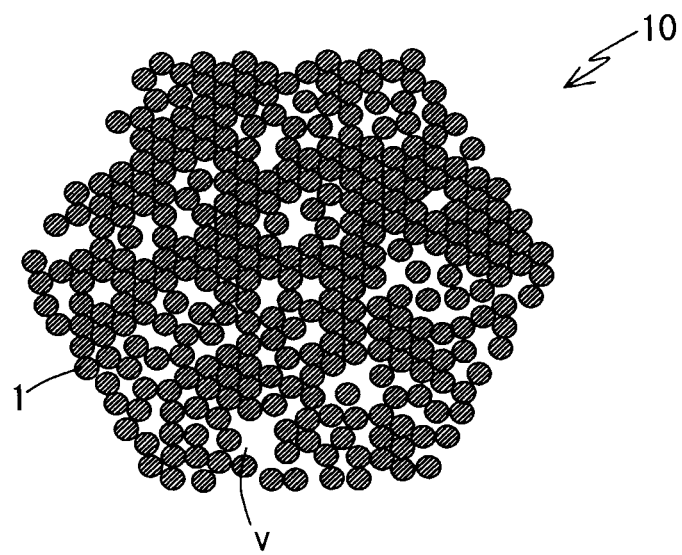
FIGS. 2A and 2B are cross sectional views of an electric wire conductor having a polygonal cross section according to another embodiment of the present invention.
Figure 2B:
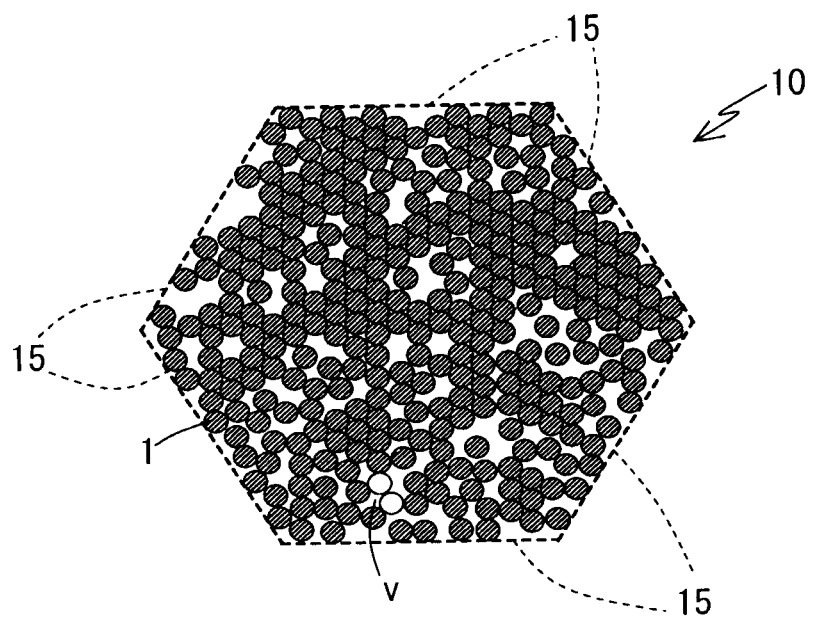

FIGS. 2A and 2B show an example of the polygonal cross section according to the present embodiment. Here, the cross section of the electric wire conductor 10 has a hexagonal shape. In other words, an outer periphery containing outer elemental wires 1 in the cross section of the electric wire conductor 10 constitutes edges 15 of the hexagon.

For the electric wire conductor 10 having a flat or polygonal cross section, plain surfaces are formed on the outer periphery of the electric wire conductor 10 owing to the edges of the cross section, which effectively provides a space-saving property when routing the electric wire along a surface. Also, in the case of assembling a great number of electric wires, the plurality of electric wires can be disposed closely or in contact with one another by utilizing the plain surfaces, thus achieving a high space-saving property.

Further, the electric wire conductor 10 having a cross section having a shape other than a flat or polygonal shape and containing an edge part which is substantially straight also has a plain surface on its outer periphery. By utilizing the plain surface, the excellent space-saving property can be achieved in the case of routing the electric wire along a surface or assembling a great number of electric wires. Examples of the shape other than the flat or polygonal shape include a sector and a semi-circle.

The elemental wires 1 constituting the electric wire conductor 10 may be made of any conductive material such as a metal material. Examples of typical material forming the elemental wire 1 include copper, a copper alloy, aluminum, and an aluminum alloy. These metal materials are suitable for the electric wire conductor 10 in that processes of forming the wire strand and compressing, for example, into any shape such as a flat or polygonal shape are easy to be carried out, and the shape thus obtained is easy to be maintained. As the elemental wires 1 constituting the electric wire conductor 10, the elemental wires all made of the same material may be used, or a multiple kinds of elemental wires made of different materials may be mixed.

Accordingly, the metal material constituting the electric wire conductor 10 may be appropriately selected, and a conductor cross-sectional area of the electric wire conductor 10 may also be appropriately selected according to a desired electrical conductivity, for example. However, when the conductor cross-sectional area is made larger, the space-saving property brought about by the non-circular cross section is effectively improved. Currently, from the viewpoint of reducing vehicle weight, aluminum or an aluminum alloy has been used as a material for an electric wire conductor for a vehicle; however, since aluminum and an aluminum alloy have a lower electrical conductivity than copper and a copper alloy, the conductor cross-sectional area tends to be larger so as to obtain the required electrical conductivity. Therefore, when the electric wire conductor 10 is made of aluminum or an aluminum alloy, the space-saving property brought about by the non-circular cross section is especially enhanced.

(2) Vacancy in the Cross Section of the Electric Wire Conductor

In the cross section of the non-circular portion of the electric wire conductor 10, vacancies are provided in regions between each of the elemental wires 1. When the cross section of the electric wire conductor 10 is formed to have a non-circular shape by compressing, for example, the vacancies between the elemental wires 1 are possibly crushed. However, the electric wire conductor 10 according to the present embodiment can maintain the vacancies of a specific size between the elemental wires 1.

The vacancies in the cross section of the electric wire conductor 10 allow the elemental wires 1 to be arranged in various relative locations. Thus, the cross section of the electric wire conductor 10 can be formed into a desired non-circular shape depending on the relative arrangements of the elemental wires 1, without drastic deformation of the shapes of each of the elemental wires 1. Additionally, the electric wire conductor 10 can bend easily by utilizing the vacancies to change the relative arrangement of the elemental wires 1, which leads to the high flexibility.

The electric wire conductor 10 according to the present embodiment has a continuous vacancy capable of accommodating one or more of the elemental wires 1. While the vacancy between the elemental wires 1 effectively improves the flexibility of the electric wire conductor 10, a state where vacancies of a certain size are provided in the cross section of the electric wire conductor 10 as a continuous region can facilitate the change of the relative arrangement of the elemental wires 1 more freely and improve the flexibility more effectively than a state where minute vacancies are evenly spread over the cross section of the electric wire conductor 10. In particular, when the vacancy capable of accommodating one or more of the elemental wires is in the cross section of the electric wire conductor 10, the elemental wires 1 moving into such a vacancy enables flexible bending of the electric wire. The flexibility further improves when the electric wire conductor 10 contains a vacancy capable of accommodating two or more, preferably three or more of the elemental wires 1.

For example, in FIGS. 1B and 2B, a vacancy indicated by a reference sign v is capable of accommodating two elemental wires 1 as indicated by virtual circles. The vacancy capable of accommodating the elemental wires 1 may be formed on either of an inner part of the electric wire conductor 10, i.e., an inner region having no contact with edges 11 to 15 constituting the outer periphery of the cross section, or an outer periphery of the electric wire conductor 10, i.e., a region facing the edges 11 to 15. Since the vacancy formed on the inner part of the electric wire conductor 10 improves the flexibility of the electric wire conductor 10 more effectively, the electric wire conductor 10 preferably has the vacancy at least in the inner part of the cross section. Further, for the purpose of improving the flexibility of the electric wire conductor 10, the vacancy capable of accommodating the specific number of elemental wires 1 is preferably provided at least in one position, more preferably in two or more positions.

Further, the size of the vacancy in the electric wire conductor 10 can be used as an index to show a degree of deformation of the elemental wires 1 at the time of forming the cross-sectional shape. The larger the vacancy is left after the forming, the less the elemental wires 1 are deformed, which contributes to suppress formation of an unnecessary irregular structure such as a sharp protrusion (i.e., burr) on the outer periphery of the electric wire conductor 10. As will be described later, for the electric wire conductor 10 formed by compressing a raw wire strand, if a compression rate increases, the vacancy between the elemental wires 1 in the cross section of the electric wire conductor 10 becomes smaller, and the burr tends to be formed on the peripheral part. In other words, the electric wire conductor 10 scarcely containing burrs has a large vacancy between the elemental wires 1, and has high flexibility.

When the cross section of the electric wire conductor 10 does not contain a continuous vacancy of a size and shape capable of accommodating the entire elemental wire 1, it is still preferable that the cross section has a continuous vacancy of a size (i.e., an area in the cross section of the electric wire conductor 10) equivalent to a cross-sectional area of one or more, more preferably two or more, still preferably three or more of the elemental wires 1. This contributes to improve the flexibility and suppress deformation of the elemental wires 1 to a certain degree.

For evaluation of the distribution, the shape, and the area of the vacancy in the cross section of the electric wire conductor 10, the electric wire conductor 10 or a covered electric wire having the insulator on the outer periphery of the electric wire conductor 10 may be subjected to processes such as cutting and polishing to obtain a cross section, and then, such a cross section is photographed. In the preparation of the cross section, the electric wire conductor 10 and the covered electric wire may be embedded in transparent resin, for example, prior to the operation including cutting as appropriate, to prevent a change in the shape or the area of the vacancies due to the operation including cutting. An elemental wire used for judging the capability of the vacancy for accommodating the elemental wire, or used as a reference for evaluating the area of the vacancy in the cross section may be an elemental wire 1 surrounding the vacancy, or an elemental wire having a circular cross section with the same cross-sectional area as that of any elemental wire 1 forming the electric wire conductor 10. Since a minute space between the elemental wires 1 has no significant effect in improving the flexibility of the electric wire conductor 10, a vacancy may be defined, for evaluating a shape and an area, without including a space between the elemental wires with a width of approximately 10% or smaller of an outer diameter of the elemental wire 1 as a continuous vacancy.

In addition to the vacancy between the elemental wires 1 in the cross section of the electric wire conductor 10 capable of accommodating one or more, or still more of the elemental wires 1, having a large total area of vacancies in the entire cross section also contributes to improve the flexibility of the electric wire conductor 10. A vacancy ratio can be used to indicate the total area of vacancies in the cross section of the electric wire conductor 10. The vacancy ratio is defined as, within the cross section of the electric wire conductor 10 perpendicularly intersecting the axial direction, a proportion of an area of vacancies not occupied by the elemental wires 1 to an area of the entire electric wire conductor 10, that is, an area of a region surrounded by the outline (the edges 11 to 15, for example) of the entire electric wire conductor 10.

The vacancy ratio suitable for obtaining high flexibility depends on the conductor cross-sectional area and the specific shape of the cross section of the electric wire conductor 10. For the cross section having a flat shape, the vacancy ratio is, in general, preferably 10% or higher for a region with the conductor cross-sectional area of 15 mm² or larger but smaller than 30 mm², and 18% or higher for a region with the conductor cross-sectional area of 30 mm² or larger but smaller than 60 mm². Further, for the cross section having a polygonal shape other than the flat shape, the vacancy ratio is preferably 18% or higher for a region with the conductor cross-sectional area of 15 mm² or larger but smaller than 30 mm².

(3) Cross-Sectional Shape of Each Elemental Wire

For the non-circular portion of the electric wire conductor 10, the cross-sectional shape of each elemental wire 1 constituting the electric wire conductor 10 may be of any shape as long as the outer shape of the entire electric wire conductor 10 has a non-circular shape such as a flat or polygonal shape. A conventional metal elemental wire having a substantially circular cross section may be employed as the elemental wire 1 of the electric wire conductor 10. However, at least a part of the plurality of elemental wires 1 may have cross sections of shapes deviated from a circle, such as flat shapes. As will be described later, when a raw wire strand is compressed, for example, to form a non-circular cross section, at least a part of the elemental wires 1 may be deformed into flat shapes depending on the material constituting the elemental wires 1, for example.

For the cross section perpendicularly intersecting the axial direction of the electric wire conductor 10 according to the present embodiment, deformation ratios of the elemental wires 1 are preferably lower at a peripheral part facing the outer periphery of the electric wire conductor 10 than at a center part which is located inside of the peripheral part.

Here, the deformation ratio of an elemental wire 1 is an index showing a degree of deviation from a circle for a cross section of a certain elemental wire 1. For an elemental wire 1 actually contained in the electric wire conductor 10, a longest diameter L is defined as a length of the longest line laterally crossing the cross section, and a diameter R is defined as a diameter of a circle having the same area as the cross-sectional area of the elemental wire 1. Then, a deformation ratio D of the elemental wire 1 is represented as follows:

$$D=(L-R)/R\times 100\% \qquad \text{Formula (1)}$$

The diameter R may be obtained by measuring a cross-sectional area of the elemental wire 1, or alternatively, if a diameter of the elemental wire 1 before deformed such as by rolling is known, or if a portion in which the elemental wires 1 are not deformed (corresponding to a low-flatness portion as will be described later) is also included in the same electric wire conductor 10, a diameter of the elemental wire 1 which is not deformed may be used as the diameter R. Further, only elemental wires 1 disposed on the outermost periphery of the electric wire conductor 10 may be employed as the elemental wires 1 in the peripheral part, and only elemental wires 1 disposed in the center of the electric wire conductor 10 may be employed as the elemental wires 1 in the center part; however, from the viewpoint of reducing influence of variation in deformation of the elemental wires 1, the deformation ratio D is preferably obtained as an average value of a plurality of elemental wires 1 included in a region having a certain area. For example, regions surrounded by a rectangle with edges in a length of approximately 10 to 30% of the width W of the electric wire conductor 10, or regions surrounded by a circle having a diameter of approximately 10 to 30% of the width W may be employed including the outermost periphery or the center of the electric wire conductor 10, and such regions may be defined as the peripheral part and the center part, respectively.

The cross section of the electric wire conductor 10 can be formed more efficiently to have a desired cross-sectional shape such as a flat or polygonal shape if the elemental wires 1 located in the peripheral part are deformed more than the elemental wires 1 located in the center part. However, if the elemental wires 1 in the peripheral part are intensively deformed, loads are concentrated on these elemental wires 1, whereby physical properties of the elemental wires 1 in the outer periphery of the electric wire conductor 10 become significantly different from those of the inner region. Further, since the shape of the elemental wires 1 in the peripheral part, especially in the outermost periphery defines the outer shape of the entire electric wire conductor 10, drastic deformation of such elemental wires 1 possibly produces an unnecessary irregular structure on the outer surface of the electric wire conductor 10. Such an irregular structure includes a burr that may possibly be formed during processing of the raw wire strand into a non-circular cross-sectional shape. The burr tends to be formed on end parts of the electric wire conductor 10. In particular, the burr tends to be formed on end parts in the width direction (±x direction) of the flat cross section, and on corner parts of the polygonal cross section. The electric wire conductor 10 preferably does not contain the burr on the peripheral part. Thus, when the electric wire conductor 10 scarcely contains the burr, it indicates that the electric wire conductor 10 has high flexibility.

For the electric wire conductor 10, making the deformation ratio of the elemental wire 1 at the peripheral part smaller than the deformation ratio of the elemental wire 1 at the center part can prevent concentration of the loads for deformation to the elemental wires 1 in the peripheral part and the formation of the unnecessary irregular structure on the outer periphery of the electric wire conductor 10. As described above, since the vacancies capable of accommodating the elemental wires 1 is provided in the electric wire conductor 10, and the elemental wires 1 may be arranged in various relative locations because of presence of the vacancies between the elemental wires 1, the cross section of the electric wire conductor 10 can be formed into a desired non-circular shape depending on the relative arrangement of the elemental wires 1, without drastic deformation of the shapes of each of the elemental wires 1.

From the viewpoint of effectively preventing the concentration of the loads for deformation to the elemental wires 1 at the outer periphery of the electric wire conductor 10 and the formation of the unnecessary irregular structure on the surface of the electric wire conductor 10, a ratio of the deformation ratio of elemental wire 1 at the peripheral part to the deformation ratio of elemental wire 1 at the center part (i.e., peripheral deformation ratio; deformation ratio at the peripheral part/deformation ratio at the center part×100%) is preferably 70% or lower. In addition, a value of the deformation ratio of the elemental wire 1 at the peripheral part is preferably 20% or lower. It is preferable that the deformation ratio of the elemental wire 1 at the peripheral part is as small as possible, and the lower limit of the deformation ratio is not particularly specified.

The deformation ratio of the elemental wire 1 at the center part is not specifically limited; however, from the viewpoint of preventing application of loads to the elemental wire 1 due to excessive deformation, the deformation ratio of the elemental wire 1 at the center part is preferably 50% or lower. On the other hand, from the viewpoint of effectively forming the cross section of the electric wire conductor 10 to have the non-circular shape while suppressing the deformation of the elemental wire 1 at the peripheral part, the deformation ratio at the center part is preferably 10% or higher.

In the electric wire conductor 10, as the number of the elemental wire 1 is increased, it becomes easier to form the cross section into a non-circular shape while keeping the deformation ratios of the elemental wires 1 at the peripheral part lower than those at the center part and providing the vacancies of sufficient sizes. For example, when the number of the elemental wire 1 is 50 or more, the condition as above can be sufficiently achieved owing to variation in relative arrangements of the elemental wires 1. On the other hand, when the number of the elemental wire 1 is less than 50, it is still preferable to provide the vacancy capable of accommodating one or more of the elemental wires 1 for the purpose of obtaining the sufficient flexibility of the electric wire conductor 10, even if the elemental wires 1 in the peripheral part are deformed at a deformation ratio equivalent to or higher than the elemental wires 1 in the center part.

(4) Other Embodiments

Hereinbefore, the embodiment has been described in which the entire region of the electric wire conductor 10 in the axial direction consists of the non-circular portion having a non-circular cross section. However, the non-circular portion may constitute a part of the entire region in the axial direction of the electric wire conductor 10. That is to say, the non-circular portion and a low-deformed portion having a cross-sectional shape more approximating a circle than the non-circular portion may be arranged adjacent to each other along the axial direction of the electric wire conductor 10, for example. The non-circular portion and the low-deformed portion consist of common elemental wires 1 integrally continuous therethrough, and have different cross-sectional shapes. The low-deformed portion has a substantially circular cross section, for example. By disposing the non-circular portion and the low-deformed portion continuously in one electric wire conductor 10, the electric wire conductor 10 can obtain both properties provided by the non-circular portion and the low-deformed portion without any process such as joining.

In the low-deformed portion with a low degree of deformation of the electric wire conductor 10 obtained through process such as rolling, it is preferable that the deformation ratio of the elemental wire 1 is lower than the deformation ratio in the non-circular portion, accordingly. In particular, the low-deformed portion having a substantially circular cross section preferably contains the elemental wires 1 also having substantially circular cross sections.

The non-circular portion and the low-deformed portion may be disposed along the axial direction of the electric wire conductor 10 in any order. Here, a configuration in which the non-circular portion is disposed in the center part of the axial direction and the low-deformed portions having a substantially circular cross section, for example, are disposed on both ends thereof can be presented as a preferred example. In this case, the non-circular portion can be used for routing in a limited space, and simultaneously other members such as terminals are attached to the low-deformed portions at both ends. This makes it possible to utilize both the space-saving property and the flexibility of the non-circular portion, as well as convenience of attaching the other members to the low-deformed portions having a circular or substantially circular cross section. Further, in the non-circular portion, a plurality of portions with different shapes or different degrees of deformation may be disposed adjacent to each other.

(5) Production Method of Electric Wire Conductor

The electric wire conductor 10 can be formed to have a desired cross-sectional shape by compressing, for example, a raw wire strand having a substantially circular cross section which contains a plurality of elemental wires 1 twisted together.

The raw wire strand is formed by being subjected to compression by applying pressure from an outer periphery of the raw wire strand. The pressure can be applied, for example, with a rolling instrument such as rollers, or a molding member such as a die. The outer shape of the electric wire conductor 10 can be defined by, for example, a shape of a surface in the rolling instrument or the molding member contacting the raw wire strand, and directions of the applying forces from the rolling instrument to the raw wire strand. Further, the size of the vacancy between the elemental wires 1 in the electric wire conductor 10 can be adjusted by controlling magnitude of the applying forces to the raw wire strand, which depends on an area of a space in the rolling instrument or the molding member for passing the raw wire strand.

In the case of rolling with the rolling instrument such as rollers, it is easier to apply a load evenly over the entire raw wire strand without concentrating a high load to an outer periphery of the raw wire strand, and vacancies between the elemental wires 1 can be sufficiently provided in the electric wire conductor 10. Further, the electric wire conductor 10 thus obtained scarcely contains burrs on the outer periphery. Meanwhile, in the case of molding with the molding member such as a die, it is easier to form the raw wire strand to have a variety of cross-sectional shapes such as a polygonal shape.

[Covered Electric Wire]

As described above, a covered electric wire according to one embodiment of the present invention contains the electric wire conductor 10 according to the embodiment of the present invention as described above, and the insulator which covers the electric wire conductor 10.

An outer shape of the entire covered electric wire including the insulator reflects the outer shape of the electric wire conductor 10. As the electric wire conductor 10 has a non-circular cross-sectional shape, the covered electric wire also has a non-circular cross-sectional shape. Further, as the electric wire conductor 10 has high flexibility in each direction, the covered electric wire also has high flexibility in each direction.

A material of the insulator is not specifically limited, and a variety of polymer materials may be used to form the insulator. Further, the polymer material may contain fillers or additives as appropriate. However, it is preferable to select the material for the insulator and a thickness thereof such that the flexibility of the insulator is higher than the flexibility of the electric wire conductor 10, so as not to deteriorate the excellent flexibility of the electric wire conductor 10. In addition, it is preferable to select the thickness of the insulator such that the non-circular cross-sectional shape of the electric wire conductor 10 is sufficiently reflected to the shape of the entire covered electric wire so that the entire covered electric wire may have a desired non-circular cross section.

The insulator may cover a whole periphery of the electric wire conductor 10. In this case, the insulator can be provided by extruding the polymer material for the insulator on the whole periphery of the electric wire conductor 10. Alternatively, insulation films, which are sheet-shaped insulators, may sandwich the electric wire conductor 10 from opposing directions. When the electric wire conductor 10 has a flat cross section, the insulation films preferably sandwich the electric wire conductor 10 from the top and the bottom in the height direction (±y direction). In this case, the polymer material formed into two insulation films are disposed at the top and the bottom of the electric wire conductor 10 and may be adjoined each other by fusing or adhesion, for example, as appropriate.

Examples of insulation of the electric wire conductor 10 with the insulation films may include lamination such as thermal lamination and dry lamination. Insulation films made of a polyester resin, for example, are disposed at both sides of the electric wire conductor 10, and then both insulation films, and each of the insulation films and the electric wire conductor 10 are adjoined by an adhesive.

In particular, when the insulator is formed by extrusion, the electric wire conductor 10 having a cross-sectional shape such as a flat or polygonal shape having straight edge parts can effectively improves wear resistance of the insulator. In the case of forming the insulator on the outer periphery of the electric wire conductor having the substantially circular cross section, an outer peripheral surface of the electric wire conductor tends to be uneven because of shapes of the elemental wires forming the electric wire conductor, which brings nonuniformity in thickness of the insulator formed on each part of the outer periphery of the electric wire conductor. In this case, for the purpose of securing sufficient thickness to satisfy specific wear resistance, it becomes necessary to form the entire insulator thick even at a part where the insulator can be thinner than other parts. On the other hand, the insulator covering the outer periphery of the electric wire conductor 10 can be easily formed in uniform thickness at all parts, because the electric wire conductor 10 having a cross section with the straight edge parts has plain surfaces on the outer periphery at positions corresponding to the edge parts. Thus, even the thickness of the entire insulator is made small, the minimum thickness needed for securing wear resistance, for example, may be sufficiently provided at each part of the outer periphery of the electric wire conductor 10. As a result, the covered electric wire having excellent wear resistance of the insulator can be obtained while preventing an increase in cost of forming a generally thick insulator and an increase in space for routing such a covered electric wire.

Further, in the covered electric wire containing the electric wire conductor having a substantially circular cross section, the insulator comes into contact with an outer object at a small area on its outer peripheral surface, and loads tend to concentrate on such a small area. To the contrary, in the covered electric wire containing the electric wire conductor 10 having a cross section with straight edge parts, the insulator is formed along the plain surface of the electric wire conductor 10 so that it may also contain a plain surface to be exposed, and when the insulator comes into contact with an outer object, the plain surface can make contact at a large area. Accordingly, even if the insulator is formed thin, loads applied upon contact can be dispersed in the large area, whereby providing the high wear resistance capable of preventing the wear due to load application.

As described above, the covered electric wire containing the electric wire conductor 10 having a cross section with straight edge parts can achieve excellent wear resistance of the insulator even the insulator is formed thin, owing to advantages that the insulator has a uniform thickness and makes contact with the outer object at a large area. These advantages are especially enhanced when the formation of the burr on the outer periphery of the electric wire 10 is suppressed.

The covered electric wire may be used in a form of a single wire in which the outer periphery of one electric wire conductor 10 is covered with the insulator, or may be used in a form of a wiring harness in which a plurality of covered electric wires are assembled and integrally bundled with a covering material, for example, as necessary. Hereinafter, examples of the wiring harness containing the covered electric wires will be described.

[Wiring Harness]

A wiring harness according to one embodiment of the present invention contains a plurality of covered electric wires being assembled, in which at least a part of the plurality of covered electric wires are the covered electric wires according to the embodiment of the present invention containing the above-mentioned electric wire conductors 10 having a non-circular cross section. The wiring harness may contain only the covered electric wires containing the above-mentioned electric wire conductors 10 having a non-circular cross section, or may contain such covered electric wires together with different kinds of covered electric wires such as a covered electric wire containing a conventional electric wire conductor having a substantially circular cross section. Further, in a case where the wiring harness contains a plurality of covered electric wires containing the electric wire conductors 10 having a non-circular cross section, features such as a material, shape, and size of the electric wire conductor 10 and the insulator constituting the plurality of covered electric wires may be of the same or may be different from each other. The plurality of covered electric wire contained in the wiring harness may be integrally bundled with an insulation material, for example, as necessary.

(1) Arrangement of the Covered Electric Wires in Wiring Harness

In the case of constructing the wire harness with the plurality of covered electric wires containing the electric wire conductor 10 having a non-circular cross section, the covered electric wires can be easily assembled to be disposed in a limited space, compared with a case where the covered electric wires containing the conventional electric wire conductor having a substantially circular cross section is used. Thus, the wire harness with an excellent space-saving property can be provided.

In the case of constructing a wiring harness with the plurality of covered electric wires containing the electric wire conductors 10 having a flat cross section, for example, the plurality of covered electric wires may be disposed to have any positional relationship. For example, the covered electric wires may be aligned side by side in the width direction x (the lateral direction) of the flat electric wire conductor 10, or may be stacked in the height direction y, or may be in a matrix shape in which the plurality of covered electric wires disposed side by side in the width direction x are stacked in multiple layers in the height direction y. That is to say, the plurality of covered electric wires may be aligned along at least either the width direction x or the height direction y. In this way, the neat arrangement of the plurality of covered electric wires containing the flat electric wire conductors 10 makes it possible to reduce spaces between the covered electric wires forming the wiring harness, thus providing the wiring harness with a remarkably excellent space-saving property.

Further, in the case of constructing a wire harness with the plurality of covered electric wires containing the electric wire conductors 10 having a polygonal cross section, the plurality of covered electric wires may also be disposed to have any positional relationship. If surfaces of the covered electric wires corresponding to edges of the polygonal shapes are disposed closely or in contact with each other, the plurality of covered electric wires may be assembled densely. In particular, a great number of covered electric wires may be disposed without spaces, or with only small spaces when the cross section of the electric wire conductor 10 is in a shape such as a hexagon, for which the degree of interior angles can be obtained by dividing 360° by an integer.

In the wiring harness, disposing a heat dissipation sheet in contact with each of the aligned covered electric wires makes it possible to ensure the heat dissipation performance of each of the covered electric wires, even when a great number of the covered electric wires are aligned closely to or in contact with one another by utilizing the non-circular cross-sectional shape. Here, the heat dissipation sheet is a sheet-shaped (including plate-shaped) member consisting of a heat dissipation material having a heat dissipation performance higher than the covered electric wire. Examples of the heat dissipation sheet may include a sheet or a plate made of aluminum or an aluminum alloy. For example, the heat dissipation sheet may be disposed between the plurality of covered electric wires constituting the wiring harness, or disposed commonly contacting the plurality of covered electric wires.

In a case where the electric wire conductor 10 has a flat or polygonal shape, and plain surfaces corresponding to the edges thereof are formed on the outer periphery of the covered electric wire, it is preferable to dispose the heat dissipation sheet in contact with the plain surfaces. Thereby, the heat dissipation performance may be effectively enhanced and the wire harness including the heat dissipation sheet may be simply constituted.

In a case where the plurality of covered electric wires are assembled by disposing the plain surfaces close to or in contact with each other, it is particularly preferable to dispose the heat dissipation sheet to interpose between the plain surfaces of the adjacent covered electric wires. Further, a plurality of interposing sheet disposed between each of the covered electric wires is preferably connected with one another by a connection member made of a heat dissipation material. The connection member enhances the heat dissipation performance of each of the covered electric wires. The connection member may be disposed as a member specialized in heat dissipation of the covered electric wires via the interposing sheets, or a member which is disposed for another purpose. For example, a columnar member constituting an automobile body may be used as the connection member so that the member may serve as a structure material for the automobile body, as the connection member which helps the heat dissipation of the covered electric wires via the interposing sheets, and further as a support member for supporting the wiring harness containing the plurality of covered electric wires.

(2) Combination with Other Electric Wires

As described above, the wiring harness according to an embodiment of the present invention may contain the covered electric wires containing the electric wire conductor 10 having a non-circular cross section according to an embodiment of the present invention in combination with other kinds of covered electric wires. The covered electric wires according to an embodiment of the present invention and other kinds of covered electric wires may have any combination of specific features such as constituent material, shape, and size. Among them, examples may include a configuration using the covered electric wire conductor according to an embodiment of the present invention (i.e., a first covered electric wire) containing the electric wire conductor 10 having a non-circular cross section made of aluminum or an aluminum alloy (i.e., aluminum material), and other kinds of covered electric wire (i.e., a second covered electric wire) containing an electric wire conductor made of copper or a copper alloy (i.e., copper material) having, for example, a substantially circular cross section having a shape more approximating a circle than the cross section of the electric wire conductor 10 of the first covered electric wire. In this case, it is preferable that a conductor cross-sectional area of the second covered electric wire is smaller than a conductor cross-sectional area of the first covered electric wire.

The aluminum material has come to be used as an electric wire conductive material for automobiles instead of the copper material for the purpose of reducing automobile weight; however, as described above, in the case where the aluminum material is used, the conductor cross-sectional area of the electric wire conductor tends to be larger than in the case where the copper material is used, because the aluminum material has a lower electrical conductivity as a material. Thus, if the electric wire conductor made of an aluminum material is used as a conventional conductor having a circular cross section and contained in the wiring harness, a diameter of the electric wire conductor becomes large, which requires a large space for routing the wiring harness; however, the electric wire conductor 10 formed to have a non-circular cross section can reduce the space required for routing while ensuring the large conductor cross-sectional area. On the other hand, even the electric wire conductor made of the copper material is used, it does not significantly interfere the weight reduction of automobiles as long as it is a small diameter wire with a small conductor cross-sectional area. Also, it hardly enlarges the space required for routing the wiring harness. Accordingly, using the first covered electric wire including the electric wire conductor 10 having a non-circular cross section made of the aluminum material in combination with the second covered electric wire including the electric wire conductor having a substantially circular cross section made of the copper material with a smaller conductor cross-sectional area, excellent properties of the copper material such as a high electrical conductivity may be utilized as a property of a part of the wiring harness while ensuring the space-saving property. Suitable examples of the electric wire conductor constituting the second covered electric wire may include a copper alloy thin wire with a conductor cross-sectional area of 0.13 mm$^2$ or smaller. Such a copper alloy thin wire may be suitably used as a signal wire. Forming the second covered electric wire into thin as described above makes it possible to effectively utilize the space-saving property brought about by the electric wire conductor 10 having a non-circular cross section contained in the first covered electric wire. The first covered electric wire and the second covered electric wire may be disposed to have any positional relationship.

Example

Hereinafter, examples according to an embodiment of the present invention are explained. It should be noted that the present invention is not limited by these examples. Here, for a cross section of an electric wire conductor formed into a non-circular shape, state of vacancies and state of deformation of elemental wires were investigated.

(Preparation of Samples)

A raw wire strand having a substantially circular cross section was prepared by twisting aluminum alloy wires having an outer diameter of 0.32 mm. Then, the raw wire strand was subjected to compression to prepare an electric wire conductor having a flat cross section and an electric wire conductor having a polygonal cross section.

As the electric wire conductor having a flat cross section, the raw wire strand was subjected to rolling with rollers to prepare the electric wire conductor having a substantially rectangular cross section. The rolling with the roller was carried out by firstly applying forces from upper and lower directions, then applying forces again from the same directions and simultaneously applying forces from both sides of a width direction. In this process, the applying forces were varied to prepare electric wire conductors with different compression rates (i.e., rates of decrease in a cross-sectional area).

As the electric wire conductor having a polygonal cross section, the raw wire strand was subjected to pultrusion with a die to prepare an electric wire conductor having a hexagonal cross section. In this process, ratios of a cross-sectional area of a hexagonal space provided in the die to a conductor cross-sectional area of the raw wire strand were varied to prepare electric wire conductors with different compression rates.

Then, each of the electric wire conductors was covered with an insulator containing polyvinyl chloride (PVC) by extrusion to prepare a covered electric wire as a sample.

(Test Method)

Each of the covered electric wires was embedded in an epoxy-based resin, and a cross section intersecting an axial direction was polished to prepare a cross-sectional sample. Then, the obtained cross-sectional samples were photographed.

Photographic images of the cross-sectional samples were subjected to image analysis to investigate whether a vacancy capable of accommodating elemental wires was formed in a region between the elemental wires. Specifically, for each of the cross sections, a vacancy having a comparatively large area was focused, an approximate circle which approximates the elemental wires surrounding the vacancy was defined, and the number of the approximate circles that could be accommodated in the vacancy was investigated.

Further, vacancy ratios of each of the electric wire conductors were evaluated through the image analysis. In the analysis, a cross-sectional area of the entire electric wire conductor (A0) was estimated from an area of a region inside an outline connecting outlines of elemental wires located at an outermost periphery of the electric wire conductor, and within the above-described region, an area of vacancies (A1) was estimated from an area of a region that was not occupied by the elemental wires. A vacancy ratio (A1/A0×100%) was calculated.

Furthermore, for the electric wire conductors having a flat cross section, deformation ratios of the elemental wires were estimated. For estimation, the deformation ratios of the elemental wires were estimated in accordance with Formula (1) as provided above. As a diameter R, the outer diameter of 0.32 mm of the raw wire strand before compressed was employed. The deformation ratios of the elemental wires were estimated for elemental wires included in a peripheral part (end part) which is shown as square region R1, and for elemental wires included in a center part which is shown as square region R2 in the cross-sectional image. An average value of the deformation ratio at each region was calculated. Further, a ratio of the deformation ratio at the peripheral part to the deformation ratio at the center part was calculated as a peripheral deformation ratio (i.e., deformation ratio at the peripheral part/deformation ratio at the center part×100%).

(Test Results)

Figure 3A:
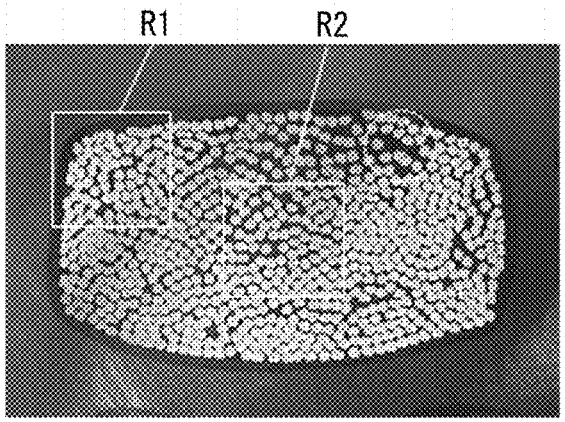
FIGS. 3A to 3C are photographic images of cross sections of covered electric wires containing the electric wire conductor having the flat cross section. The electric wire conductors in FIGS. 3A and 3B have different compression ratios such that the compression ratio in FIG. 3B is higher.
Figure 3B:
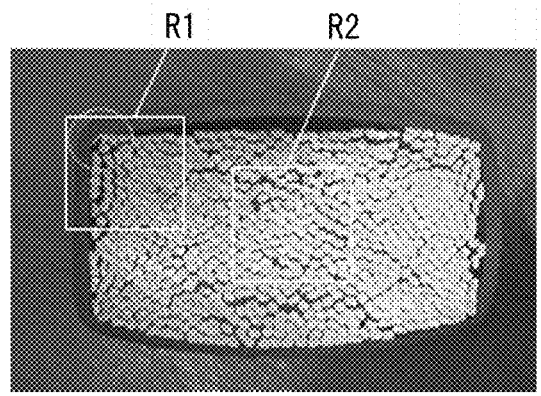
Figure 4A:
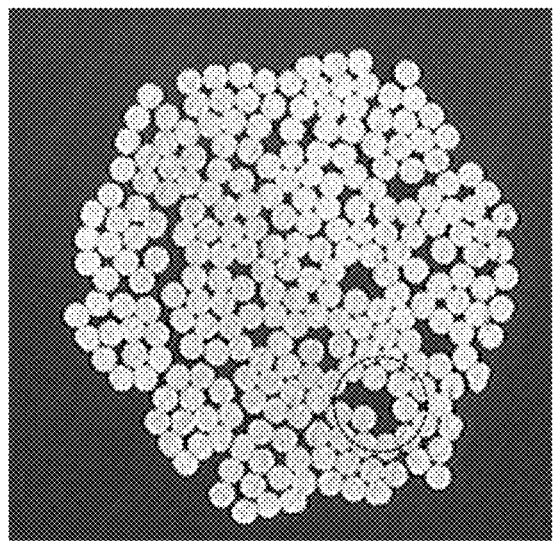
FIGS. 4A to 4D are photographic images of cross sections of covered electric wires containing the electric wire conductor having the polygonal cross section. The electric wire conductors in FIGS. 4A and 4B have different compression ratios such that the compression ratio in FIG. 4B is higher.
Figure 4B:
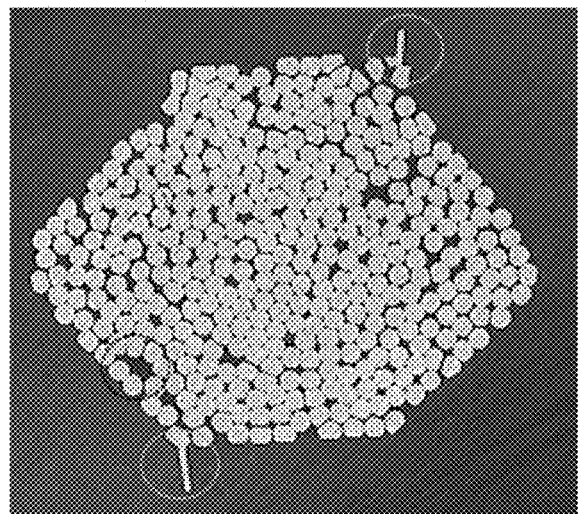

FIGS. 3A and 3B are photographic images of the cross sections of the covered electric wires containing the electric wire conductors having a flat cross section. While both of the electric wire conductors had a conductor cross-sectional area of 60 mm$^2$, applying forces from the rollers when compressed were varied so that the cross section in FIG. 3B was formed to have a higher compression rate. Also, FIGS. 4A and 4B are photographic images of the cross sections of the covered electric wires containing the electric wire conductors having a polygonal cross section. For the electric wire conductor in FIG. 4A with a conductor cross-sectional area of 20 mm$^2$ and the electric wire conductor in FIG. 4B with a conductor cross-sectional area of 30 mm$^2$, the same die was used for molding, thus the cross section in FIG. 4B was formed to have a higher compression rate.

When comparing the cross-sectional images in FIGS. 3A and 3B having a flat cross section, the sample in FIG. 3A with a low compression rate had comparatively large vacancies between the elemental wires, while the sample in FIG. 3B with a high compression rate included the elemental wires densely filled. In addition, while an outer periphery of the sample in FIG. 3A was formed smoothly, a sharp burr was produced on an outer periphery of the sample in FIG. 3B as indicated by a circle in the upper left.

Similarly as provided above, when comparing the cross-sectional images in FIGS. 4A and 4B having a polygonal cross section, the sample in FIG. 4A with a low compression rate had comparatively large vacancies between the elemental wires, while the sample in FIG. 4B with a high compression rate included the elemental wires densely filled. In addition, while an outer periphery of the sample in FIG. 4A was formed smoothly, sharp burrs were produced on an outer periphery of the sample in FIG. 4B as indicated by circles in the upper right and the lower left.

Next, for evaluating the size of the vacancies between the elemental wires in detail, investigation results on the number of the elemental wires which could be accommodated in the vacancies will be described. For the electric wire conductor having a flat cross section, a region in FIG. 3A indicated by a dashed circle was focused. As indicated by circles in FIG. 3C, an approximate circle which approximates an outer diameter of the elemental wires surrounding the vacancy was defined, and the vacancy was filled with the approximate circles. Then, the maximum number of the approximate circles which could be accommodated in the vacancy was evaluated.

Figure 3C:
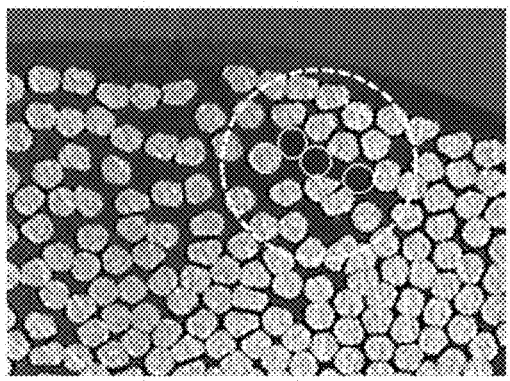

As shown in FIG. 3C, the vacancy which was focused in FIG. 3A could accommodate three elemental wires. On the other hand, the electric wire conductor in FIG. 3B with a high compression rate had no vacancy in the cross section of the size capable of accommodating one or more of the circular elemental wires.

Figure 4C:
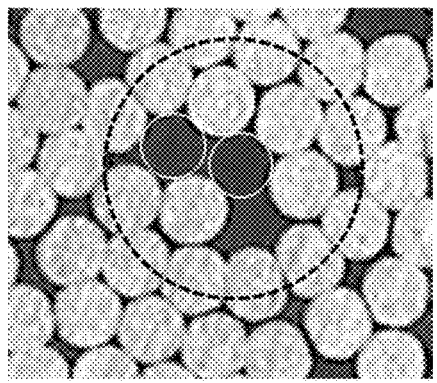
Figure 4D:
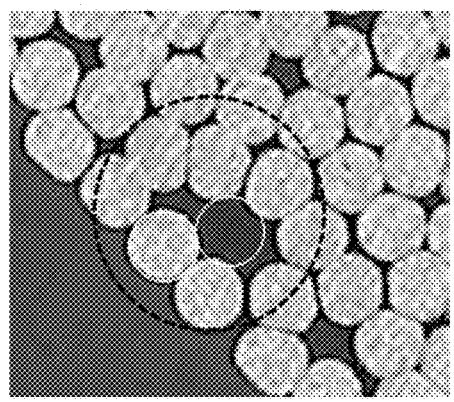

Similar analysis as above was made on the electric wire conductors having a polygonal cross section. That is, in FIGS. 4A and 4B, vacancies in regions indicated by dashed circles were focused, and as shown in FIGS. 4C and 4D, the vacancies were filled with approximate circles indicating the elemental wires surrounding the vacancy. Then, the maximum number of the approximate circles which could be accommodated in the vacancies were evaluated.

As shown in FIG. 4C, the vacancy focused in FIG. 4A could accommodate two elemental wires. On the other hand, the vacancy in the electric wire conductor in FIG. 4B with a high compression rate could barely accommodate one elemental wire.

Accordingly, it was confirmed that, for the electric wire conductor having the cross-sectional shape of either a flat or polygonal shape, providing a vacancy capable of accommodating two or more of the elemental wires between the elemental wires makes it possible to obtain a preferable electric wire conductor containing a smooth outer peripheral surface without a burr.

Vacancy ratios of the entire cross sections of the electric conductors were 30% in FIG. 3A, 16% in FIG. 3B, 24% in FIG. 4A and 16% in FIG. 4B. Thus, the electric wire conductor having the smooth outer peripheral surface without a burr contained vacancies in regions between the elemental wires that are capable of accommodating two or more of the elemental wires, and had a large vacancy ratio in the entire cross section.

Further, in the cross-sectional images, shapes of the elemental wires located in the peripheral part and shapes of the elemental wires located in the center part were visually compared. In the sample in FIG. 3A with a low compression rate, deformation of the elemental wires in the peripheral part was smaller than deformation in the center part. In the sample in FIG. 4A, the elemental wires were scarcely deformed in both of the peripheral part and the center part. On the other hand, in the samples in FIGS. 3B and 4B with a high compression rate, the elemental wires located in the peripheral part were deformed at a rate equivalent to or larger than the elemental wires located in the center part. Thus, it was confirmed that, for the electric wire conductor containing large vacancies between the elemental wires and having no burr on the outer peripheral surface, deformation of the elemental wires was smaller in the peripheral part than deformation in the center part, even in a part where burrs can be formed.

To confirm such a characteristic quantitatively, Table 1 shows evaluation results on the deformation ratios of the elemental wires at the peripheral part and the center part, respectively, for the electric wire conductors having a flat cross section in FIGS. 3A and 3B which corresponds to Samples (a) and (b).

TABLE 1

| | Deformation Ratio of Elemental Wires | | |
|---|---|---|---|
| Sample | Peripheral part | Center part | Peripheral deformation ratio |
| (a) | 3.8% | 21% | 18% |
| (b) | 21% | 21% | 100% |

The deformation ratios at the center part of the electric wire conductor were the same in Sample (a) and Sample (b). However, the deformation ratios at the peripheral part were greatly different between Sample (a) and Sample (b). In Sample (a), the deformation ratio at the peripheral part was smaller than the deformation ratio at the center part, which was kept as low as 18% of the value at the center part. To the contrary, in Sample (b), the deformation ratio at the peripheral part was the same as the deformation ratio at the center part. Thus, it was confirmed that, for the electric wire conductor having a small compression rate of the elemental wires and containing no burr, large vacancies were provided in the cross section, and the deformation rate of the elemental wires at the peripheral part was smaller than the deformation rate at the center part.

Although embodiments of the present invention have been described above in detail, the present invention is not limited to the particular embodiment(s) disclosed herein, and various changes and modifications may be made without deviating from the scope of the present invention.

LIST OF REFERENCE NUMERALS

1 Elemental wire
10 Electric wire conductor
11-15 Edges of a cross section
v Vacancy

The invention claimed is:
1. An electric wire conductor, comprising a wire strand comprising a plurality of elemental wires twisted together, the conductor having a non-circular portion where a cross section intersecting an axial direction of the wire strand has a polygonal shape other than a flat shape,
   the cross section of the non-circular portion having a continuous vacancy capable of accommodating two or more of the elemental wires,
   a conductor cross sectional area being 15 mm$^2$ or larger and smaller than 30 mm$^2$,
   a vacancy ratio, which is a ratio of vacancies not occupied by the wires in the cross section of the non-circular portion, being 24% or more.
2. The electric wire conductor according to claim 1, wherein the non-circular portion comprises no burr on an outer periphery of the cross section.
3. The electric wire conductor according to claim 1, wherein deformation ratios of the elemental wires from a circle in the cross section of the non-circular portion are lower at a part facing an outer periphery of the non-circular portion than at a center part of the non-circular portion.

4. The electric wire conductor according to claim 1, wherein the cross section of the non-circular portion comprises a continuous vacancy capable of accommodating three or more of the elemental wires.

5. A covered electric wire comprising:
the electric wire conductor according to claim 1; and
an insulator covering the electric wire conductor.

6. A wiring harness comprising the covered electric wire according to claim 5.

* * * * *